United States Patent [19]

O'Connor

[11] Patent Number: 4,872,628
[45] Date of Patent: Oct. 10, 1989

[54] MECHANICALLY COUNTERBALANCING PLATFORM

[76] Inventor: Chadwell O'Connor, 2024 Galaxy Dr., Newport Beach, Calif. 92660

[21] Appl. No.: 129,469

[22] Filed: Dec. 7, 1987

[51] Int. Cl.$^4$ ............................................. F16M 11/04
[52] U.S. Cl. ..................................... 248/178; 74/521; 248/276
[58] Field of Search ............ 248/178, 276, 277, 281.1, 248/284, 371, 372.1, 364; 74/520, 521; 354/293

[56] References Cited

U.S. PATENT DOCUMENTS

| | | | |
|---|---|---|---|
| 2,176,636 | 10/1939 | Meachan | 74/521 X |
| 3,291,431 | 12/1966 | Daniel, Jr. | 74/521 X |
| 3,840,206 | 10/1974 | Palmer | 248/276 |
| 4,093,364 | 6/1978 | Miller | 354/293 X |

FOREIGN PATENT DOCUMENTS 7134 of 1889 United Kingdom ................ 248/178

Primary Examiner—Ramon S. Britts
Assistant Examiner—David L. Talbott
Attorney, Agent, or Firm—Leydig, Voit & Mayer

[57] ABSTRACT

An instrument support platform system with a base, an elongated platform having front and rear portions, and a linkage coupling the base and platform. The linkage causes the rear of the platform to be raised, and the front held without lowering, when the platform is tilted down, and the reverse when the platform is raised and the rear is held without lowering. The center of gravity of an instrument on the platform is therefore held at an absolute level and slightly raised when tilting the platform, making the assembly counterbalanced and gravity biased to a level platform position.

2 Claims, 5 Drawing Sheets

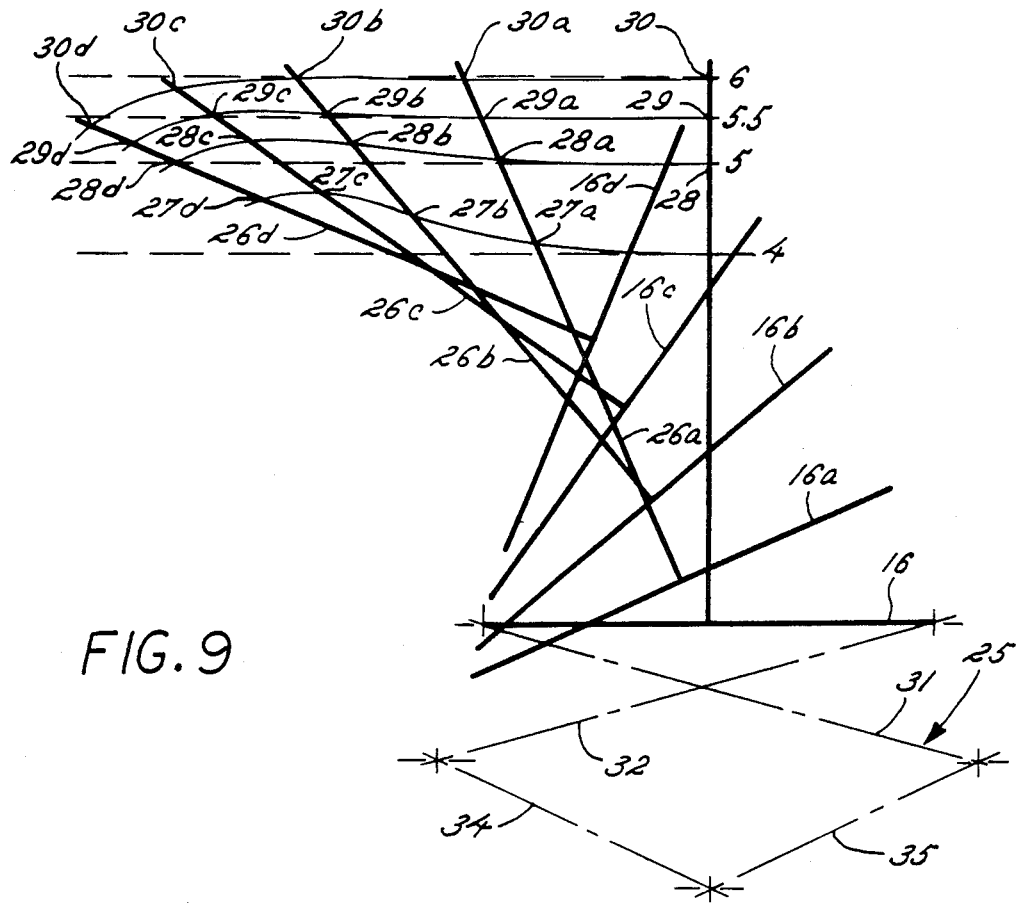

MECHANICALLY COUNTERBALANCING PLATFORM

BACKGROUND

This invention relates generally to instrument support platforms and more particularly concerns a platform whose tilting movement is mechanically counterbalanced.

Instruments such as television cameras are typically mounted on a platform which, in turn, is mounted on a tripod or a pedestal. The platform is usually mounted for rotation about a vertical axis, i.e., for panning movement, and rotation about a horizontal cross axis, i.e., for tilting of the supported camera both up and down. It is also common to provide some means for counterbalancing the camera when it is tilted. Typically, some sort of counterbalancing spring arrangement is employed.

Counterbalancing spring arrangements must combine adequate force with considerable range of adjustment of that force, which usually means that they are expensive components of a platform system. Total force and an adequate adjustment range are needed because camera weights may vary greatly depending, even for a given model camera, upon the selection of a lens and/or a battery pack.

Accordingly, it is the primary aim of the invention to provide a tiltable instrument supporting platform that is mechanically counterbalanced without springs or other similar energy storage devices. A related object of the invention is to provide a platform of this kind which is inexpensive to manufacture.

Another object is to provide a platform as characterized above that operates smoothly and with little friction. Yet another object is to provide a platform of the foregoing type that can be easily and economically maintained.

SUMMARY

The instrument supporting platform system of the invention has a base, an elongated platform having front and rear portions, and a linkage coupling the platform to the base. When the platform is tilted up, or tilted down, the linkage raises the entire platform sufficiently to cause a point at a fixed perpendicular distance from the top of the platform to maintain an absolute vertical height and to raise slightly as the platform is increasingly tilted. When this point coincides with the center of gravity of an instrument supported on the platform, the assembly will be counterbalanced, with a slight force being created tending to return the platform to level as the center of gravity is elevated. The linkage is preferably doubled, with a duplicate structure being at opposite lateral sides of the platform for lateral and torsional stability.

DRAWINGS

Other objects and advantages of the invention will become apparent upon reading the following detailed description and upon reference to the drawings, in which:

FIG. 9 is a multi-position layout showing the effect of tilting the platform in one direction.

DESCRIPTION

Figure 1:
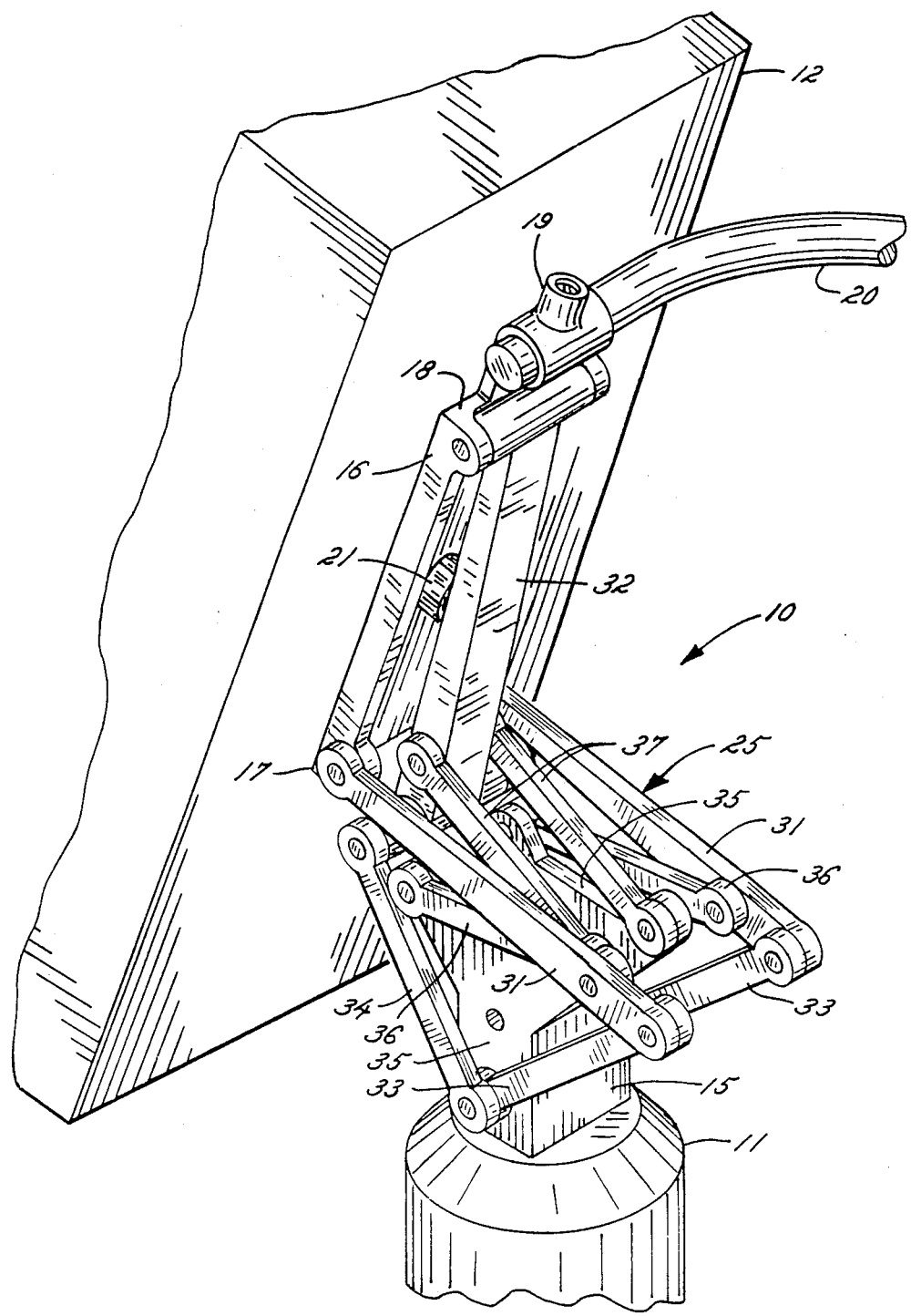
FIG. 1 is a perspective of an instrument supporting platform system embodying the invention interposed between an instrument and a pedestal.
Figure 2:
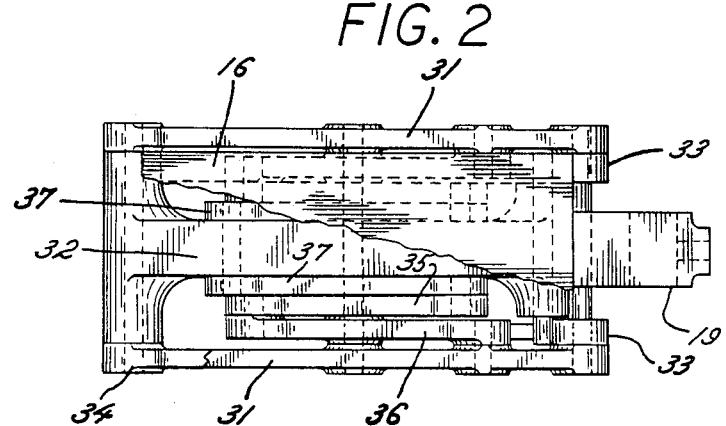
FIG. 2 is a top plan, with portions broken away, of the platform shown in FIG. 1.
Figure 3:
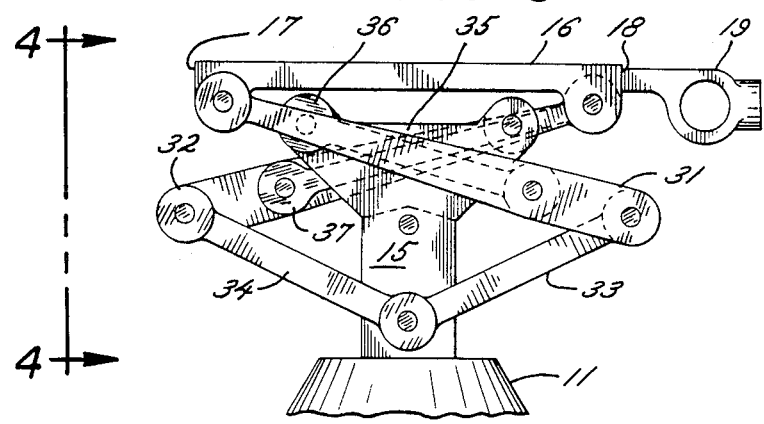
FIG. 3 is a side elevation of the platform appearing in FIG. 2.
Figure 4:
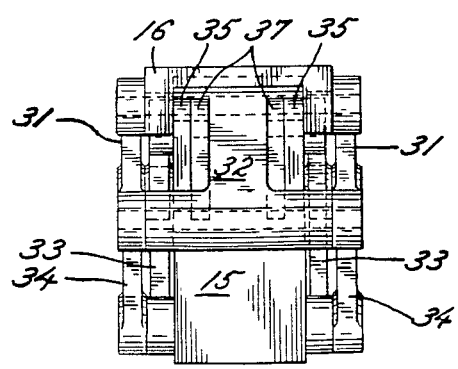
FIG. 4 is an end elevation taken along the line 4—4 in FIG. 3.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawings, there is shown an instrument support platform system 10 mounted on a schematically shown pedestal 11 and carrying a schematically shown instrument such as as television camera 12. The platform system 10 includes a base 15 and an elongated platform 16 having front and rear portions 17 and 18, respectively. A handle lug 19 is formed at the rear portion 18 of the platform 16 for receiving, from either side, a control handle 20. As is customary, the camera 12 can be mounted in adjusted position along the fore and aft axis of the platform 16, and is secured by a thumb screw 21.

A linkage 25 couples the platform 16 and the base 15 and, as a feature of the invention, the linkage 25 is, in effect, a duplicate linkage with corresponding portions at each lateral side of the platform 16 so as to give the platform lateral and torsional stability. That is, the platform 16 can readily tilt up or down, but side-to-side tilting is constrained and restricted, and slackness or side-to-side movement is also restricted during panning movement of the assembly.

In accordance with the invention, the linkage 25 raises the rear portion 18 of the platform 16 when the platform is tilted down and does not lower the front portion 17, and raises the front portion 17 of the platform 16 when the platform is tilted up and does not lower the rear portion 18, the effect of which is to cause the center of the platform to rise sufficiently far so that a point at fixed perpendicular distance from the top of the platform 16 is maintained at an absolute vertical height and even raises slightly as the platform is increasingly tilted. Before considering the specific elements of the linkage 25, the effect of the arrangement can be seen in FIG. 9. The linkage 25 normally supports the platform in a level position. On a line 26 perpendicular from the center of the platform 16 are points 27, 28, 29 and 30 representing spacings above the platform of, in this particular instance, 4, 5, 5½ and 6 inches—the significance of which will be discussed below.

As the platform 16 tilts through successive positions 16a–16d, it is also raised by the linkage 25 so that the points 27–30, moving with the alternate positions 26a–26d of the line 26, move through successive positions 27a–30a to 27d–30d. The points 27–30 represent possible centers of gravity for different instruments mounted on the platform 16. So long as the center of gravity moves on a level or slightly rising path, the instrument is counterbalanced by gravity. A camera with its center of gravity 4 inches from the platform in this example, i.e., at point 27, will be at point 27c when the platform 16 assumes the approximate 60° angle of platform position 16c. If the operator then releases the handle 20, the instrument and platform will "fall" with gravity pulling the center of gravity back down the upwardly sloping path through points 27b and 27a to the platform level position where the center of gravity is at point 27. If the platform angle becomes too steep, and the center of gravity path starts to slope downward, as in the position between points 28c and 28d, the assembly, if released, will tend to fall in the other direction but, as will be seen, the linkage 25 restricts that movement.

So long as a center of gravity path is substantially horizontal, little energy is expended in tilting the platform other than overcoming friction, and thus the camera is counterbalanced.

Considering the linkage 25 in detail, a pair of arms 31 are pivoted to the outside of lugs on the front portion 17 of the platform 16, and a single arm 32 is pivoted within two lugs on the rear portion 18 of the platform. Being coupled to both rear lugs makes the arm 32 function as two arms each connected to one side of the platform. Links 33 pivoted on the base 15 mount the lower ends of the arms 31, and links 34 also pivoted on the base 15 mount the lower ends of the arm 32.

Figure 5:
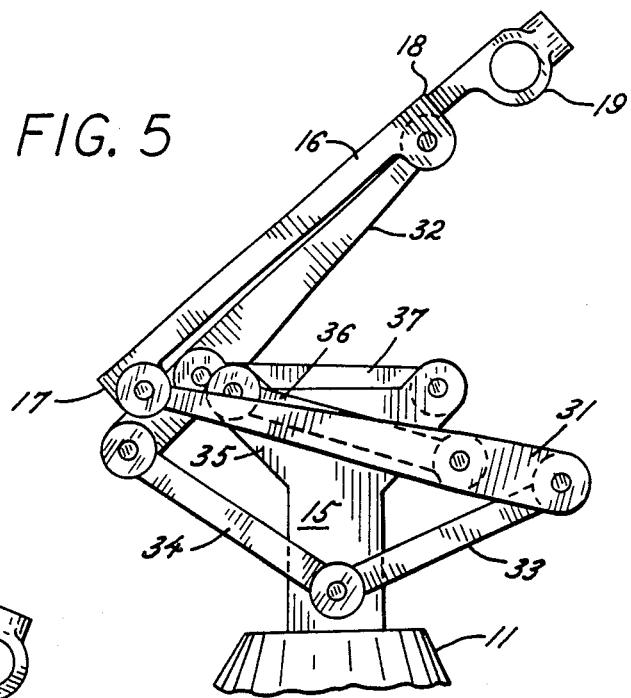
FIGS. 5, 6, 7 and 8 are side elevations like FIG. 3 but showing the platform in different positions of tilted adjustment.
Figure 6:
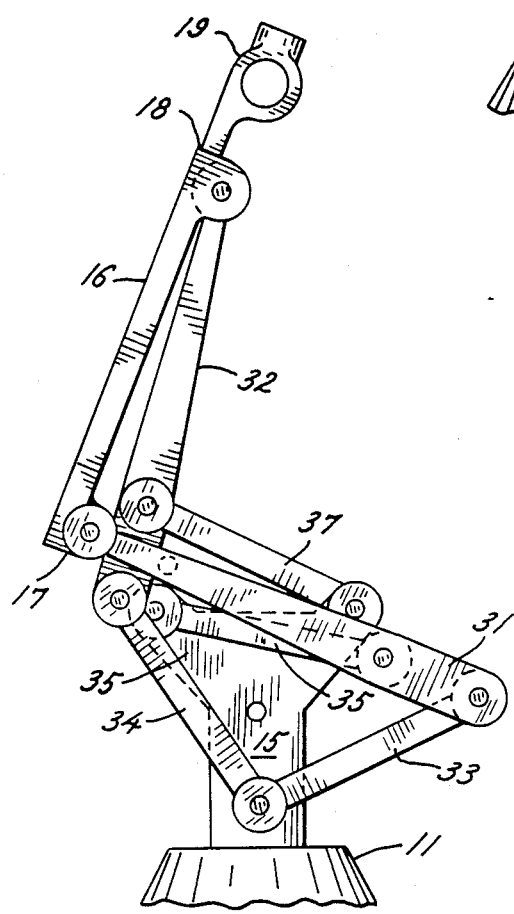
Figure 7:
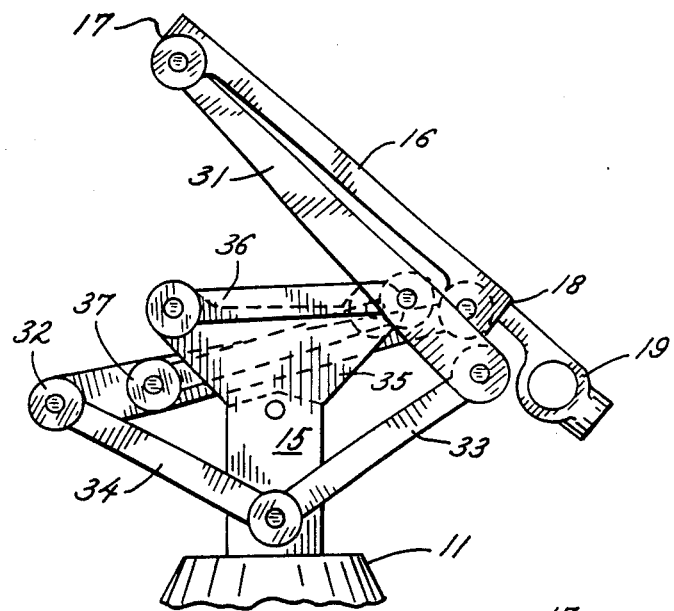
Figure 8:
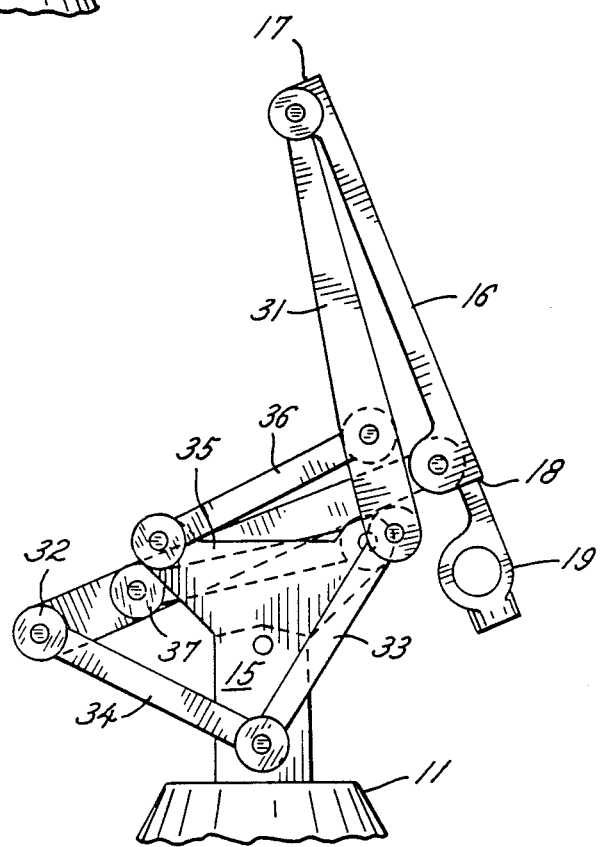

The base 15 is formed with upstanding yoke portions 35, and control links 36 pivoted on the outside of the yoke portions 35 are pivotally connected to the arms 31 to control upward tilting movement of the platform 16, and control links 37 pivoted on the inside of the yoke portions 35 are pivotally connected to opposite sides of the arm 32 to control downward tilting of the platform 16. The combined effect of these arms, links and base is to produce the range of platform motion shown in FIGS. 5-9.

When the platform 16 reaches its extreme tilt angle (shown respectively in FIGS. 6 and 8), it will be seen that the links 36 and 37 arrest further tilting movement. Therefore, even if the particular center of gravity curve associated with a mounted camera has gone overcenter, the platform system 10 will continue to control the camera.

Measurements of commonly used video cameras shows that their centers of gravity are within a 4 to 6 inch range above their bottom mounting surfaces. Total camera weight is greatly dependent upon the selection of the lens used, but typically the lens axis passes through or close to the center of gravity of the camera.

The camera battery pack can also greatly vary total camera weight, but such packs can be conveniently mounted on the back of the camera so that the pack center of gravity is at about the same height as the basic camera center of gravity. Under such conditions, virtually any camera assembly will have a center of gravity within a narrow vertical range, such as the 4 to 6 inch range, for which an instrument support platform system of this kind may be designed. The camera's center of gravity could well vary significantly along the fore and aft axis of the camera, but this is compensated for by selecting the proper fore and aft position for mounting the camera on the platform 16.

Those skilled in this art will appreciate that the instrument support platform system 10, which does not use any spring or other energy absorbing device, is economical to manufacture and exceptionally reliable in operation, calling for minimum maintenance. Since motion is only through pivoted links, the platform 10 operates with little friction and quite smoothly.

I claim as my invention:

1. An instrument supporting platform system comprising, in combination, a base, an elongated platform having front and rear portions, and linkage means connecting the platforms and said base for defining a predetermined tilting movement of the platform both up from the horizontal, causing the front portion of the platform to rise, and down from the horizontal, causing the rear portion of the platform to rise, said linkage means further including means for defining predetermined paths of travel whether the platform is tilted up or down from the horizontal to cause the center of the platform to rise sufficiently far to cause a point at a fixed perpendicular distance from the top of the platform to maintain a substantially absolute vertical height and to raise slightly as the platform is increasingly tilted, said point corresponding substantially to the center of gravity of an instrument supported on said platform, whereby the instrument supported on said platform is automatically substantially counterbalanced by gravity at any position of the platform relative to the horizontal when the platform is tilted up from the horizontal and when the platform is tilted down from the horizontal.

2. The combination of claim 1 in which said means is a duplicate linkage with corresponding portions at each lateral side of said platform to give the platform lateral and torsional stability.

* * * * *

UNITED STATES PATENT AND TRADEMARK OFFICE
CERTIFICATE OF CORRECTION

PATENT NO. : 4,872,628

DATED : October 10, 1989

INVENTOR(S) : Chadwell O'Connor

It is certified that error appears in the above-identified patent and that said Letters Patent is hereby corrected as shown below:

Title page:

In the Abstract:

In line 6, change "and the reverse when the platform is raised" to -- and the reverse when the platform is tilted up, i.e., the front of the platform is raised --.

Signed and Sealed this

First Day of October, 1991

Attest:

HARRY F. MANBECK, JR.

Attesting Officer

Commissioner of Patents and Trademarks